Figure 6:
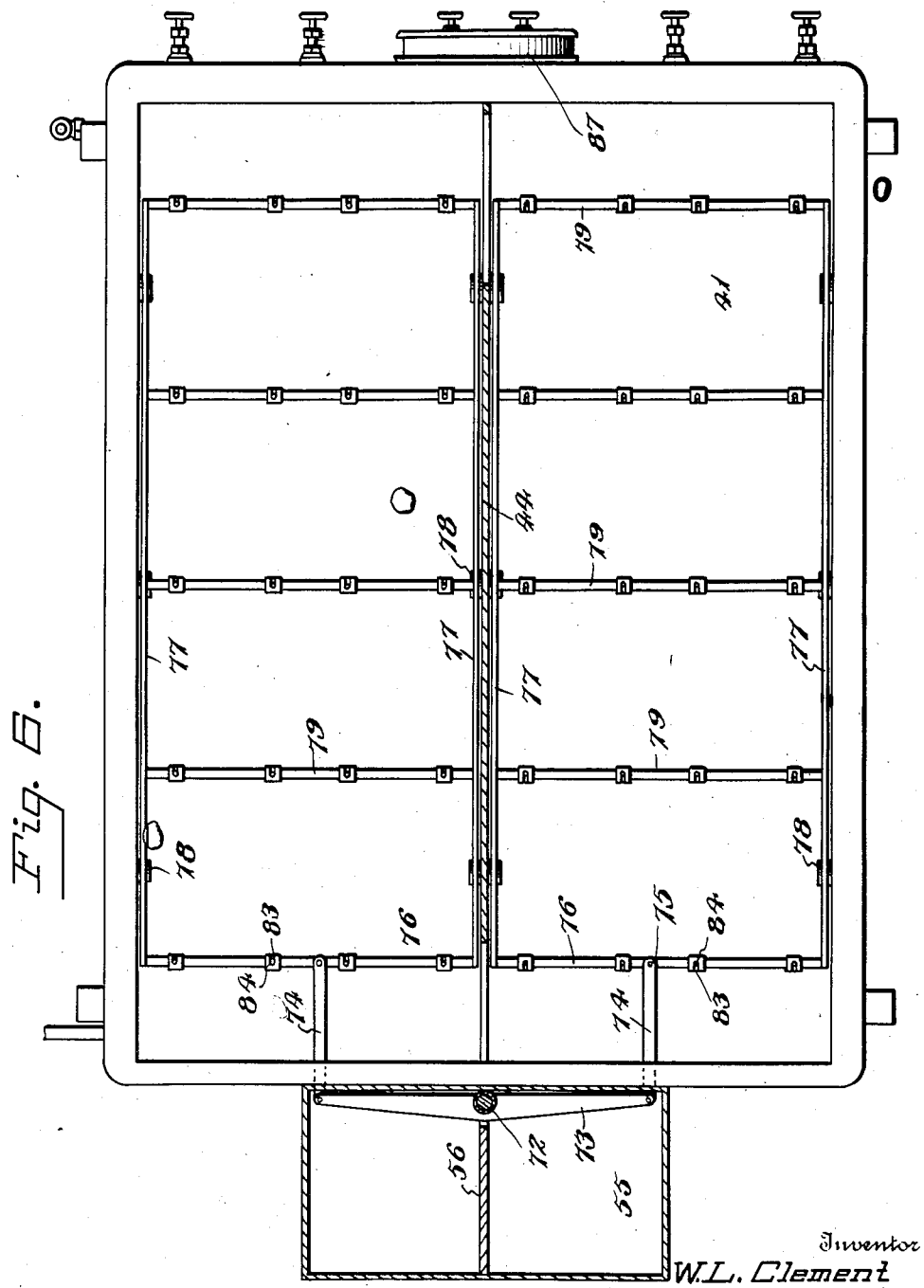

July 10, 1934.    W. L. CLEMENT    1,965,576
CONCENTRATION OF FRUIT JUICES
Filed Sept. 12, 1930    6 Sheets-Sheet 1

Inventor
W. L. Clement
By Lacey & Lacey, Attorneys

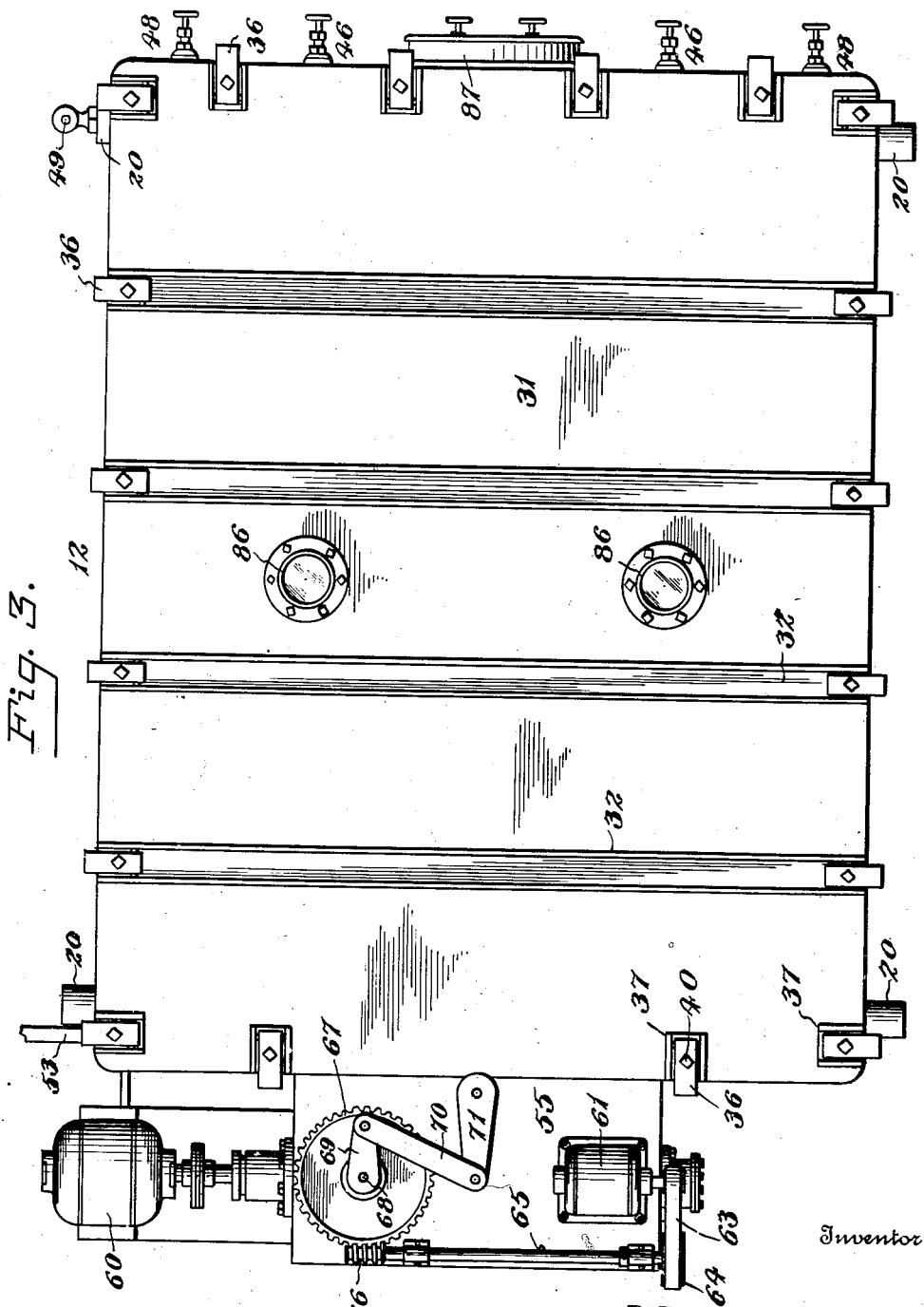

July 10, 1934.  W. L. CLEMENT  1,965,576
CONCENTRATION OF FRUIT JUICES
Filed Sept. 12, 1930  6 Sheets-Sheet 3
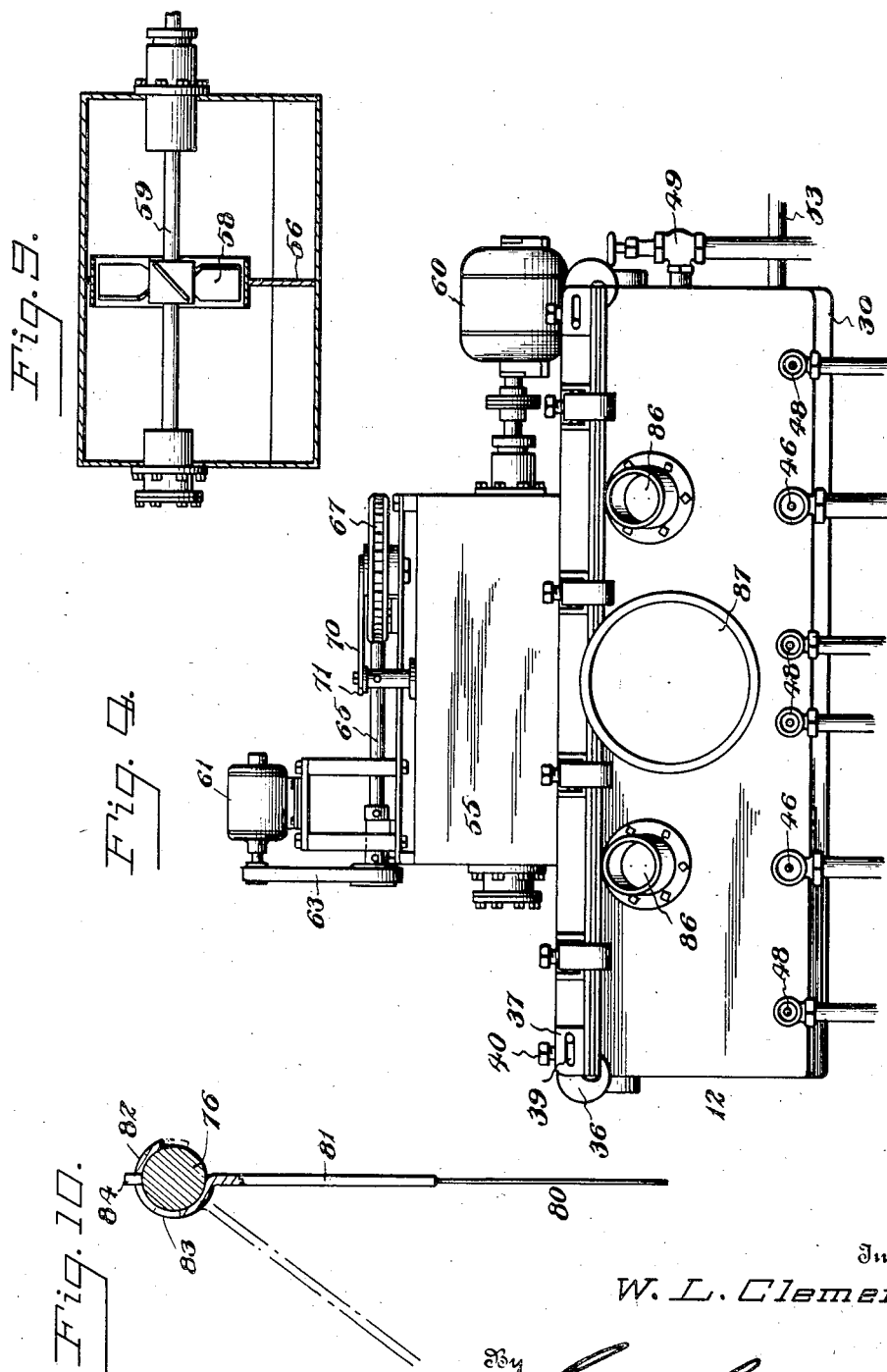

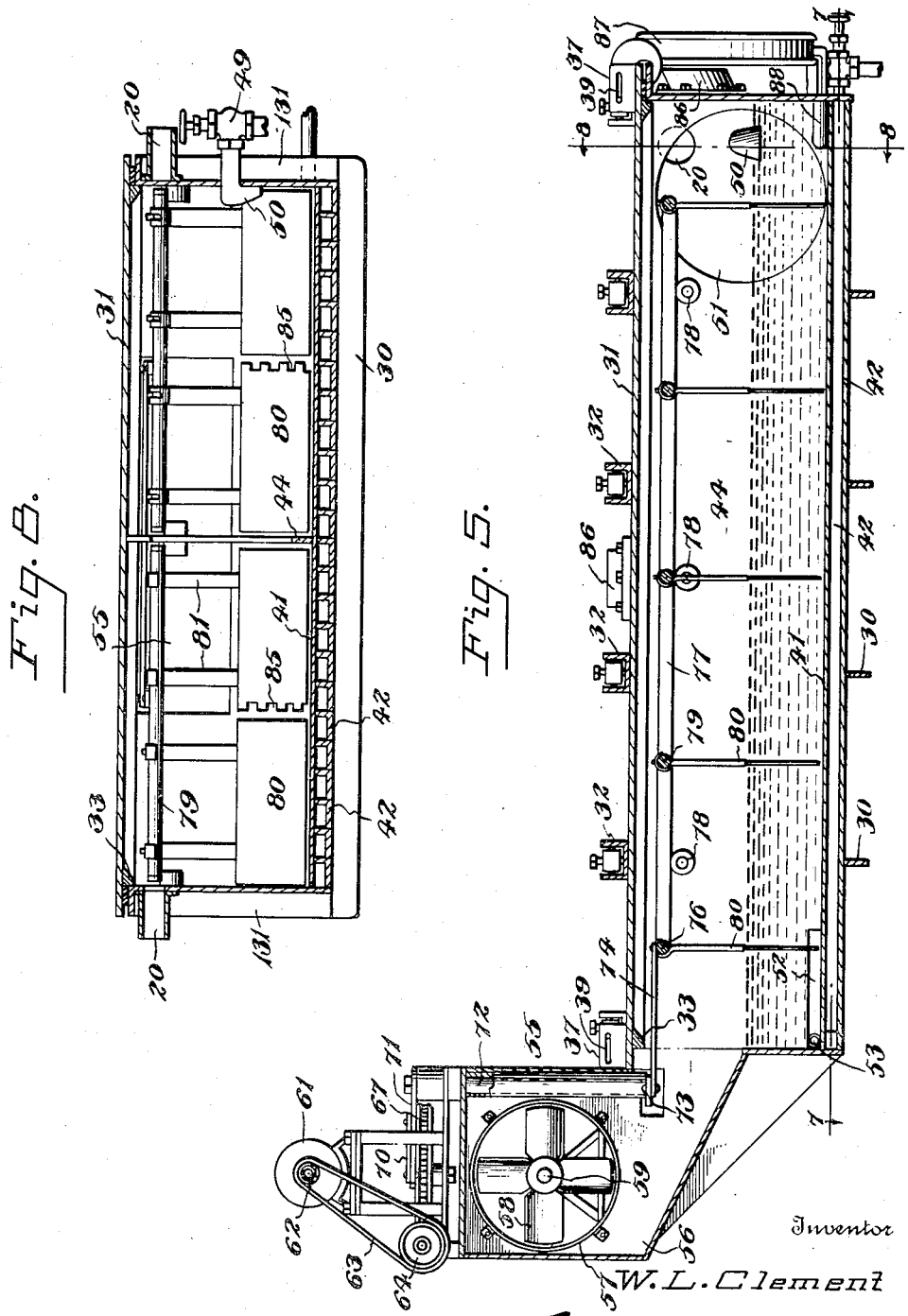

July 10, 1934.  W. L. CLEMENT  1,965,576
CONCENTRATION OF FRUIT JUICES
Filed Sept. 12, 1930  6 Sheets-Sheet 5

Inventor
W. L. Clement
By Lacey & Lacey, Attorneys

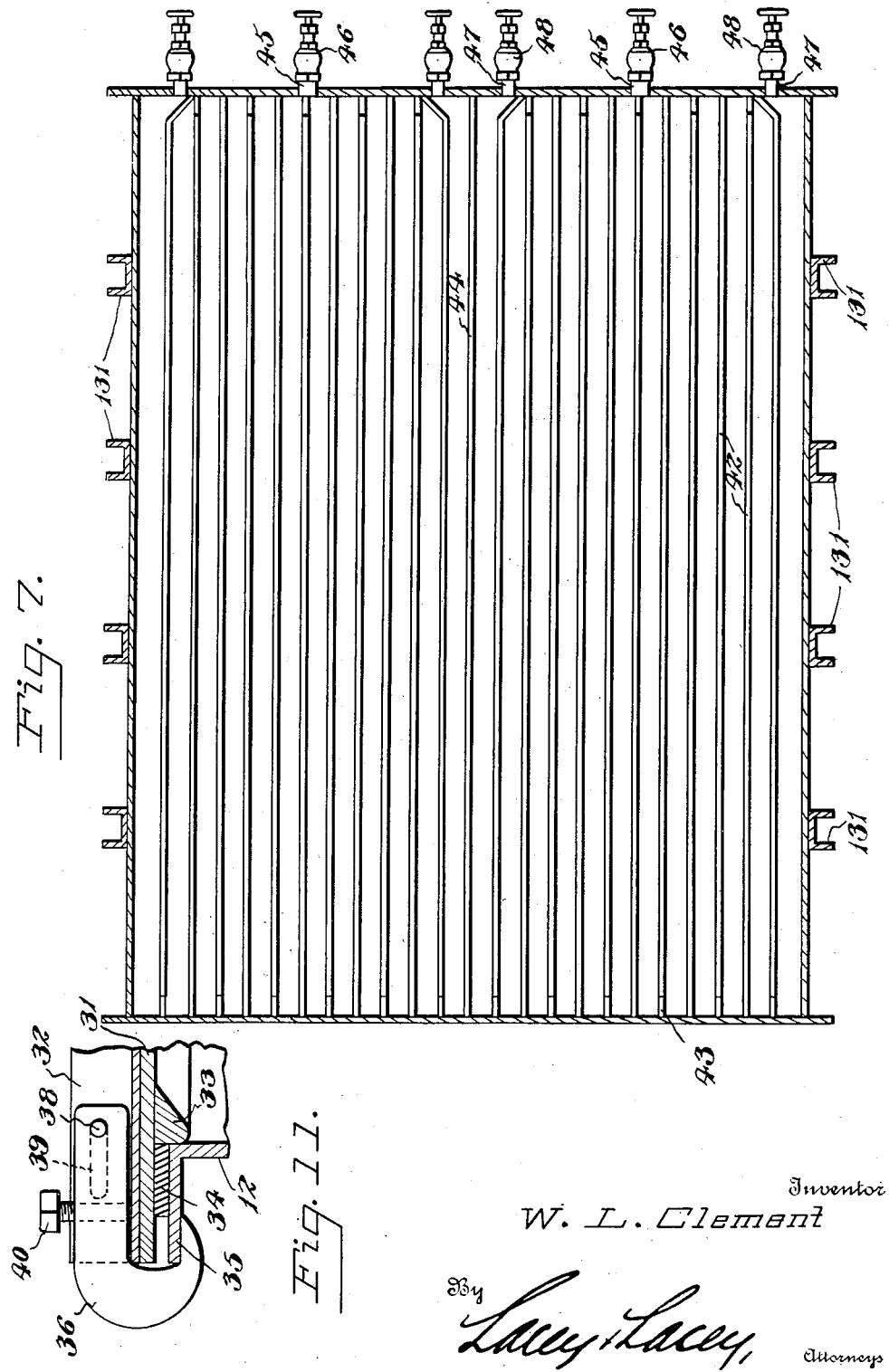

Patented July 10, 1934

1,965,576

UNITED STATES PATENT OFFICE 1,965,576

CONCENTRATION OF FRUIT JUICES

Walter L. Clement, Orlando, Fla.

Application September 12, 1930, Serial No. 481,580

6 Claims. (Cl. 159—23)

This invention relates to the concentration of fruit juices and has special reference to the dehydrator, the object being to provide a dehydrator of novel construction and operation whereby the fruit juices will be concentrated and reduced to such consistency as is desired. The invention seeks generally to provide means and a process of operation for treating fruit so that the juice will be concentrated and the product will be free from all foreign matter including the oils and terpenes which are generally contained in the seed and the rind. The invention also includes in the process of operation means whereby all bacteria which may be upon the exterior of the fruit will be destroyed and the fruit will be maintained in a sanitary condition through the entire process while the juices will be agitated under a vacuum in the tanks and dehydrator to prevent any change.

The invention is illustrated in the accompanying drawings and will be hereinafter fully described, the novel features being more particularly defined in the appended claims.

In the drawings:

Figure 1 is a diagrammatic view illustrating in top plan the general arrangement of an apparatus designed for the practice of the invention, Fig. 2 is a diagrammatic elevation of the dehydrator and the parts immediately associated therewith, Fig. 3 is an enlarged top plan view of the dehydrator, Fig. 4 is an end view of the same, Fig. 5 is a central vertical longitudinal section, Fig. 6 is a plan view of the dehydrator with the cover removed and parts in horizontal section, Fig. 7 is a horizontal section on the line 7—7 of Fig. 5, Fig. 8 is a transverse section on the line 8—8 of Fig. 5, Fig. 9 is a detail section taken through the fan which effects circulation of the vapors in the dehydrator, Fig. 10 is an enlarged detail sectional elevation of one of the agitators in the dehydrator, and Fig. 11 is an enlarged detail section illustrating more particularly the means for securing the cover upon the body of the dehydrator.

While the process or apparatus disclosed herein may be used for treating various fruits to concentrate the juices of the same, it is intended primarily for use in treating oranges, and in the following description reference to oranges may be found but it will be understood that other fruit may be treated just as well. The fruit is dumped upon a table 1 adjacent a plurality of vats, shown at 2, and the unsound fruit is eliminated after which the table is tilted so that the fruit will be deposited in the first compartment of the washer which compartment or vat is filled with warm water and may be equipped with a mechanical stirrer or agitator so that the fruit may be readily stirred or agitated within this vat for the purpose of washing off all loose dirt. The fruit is then transferred to a second or intermediate vat which is filled with hot water charged with some germ-destroying agent so that all bacteria upon the fruit will be destroyed after which the fruit is transferred to the third vat containing cold water so that it may be freed of all germicides as well as all other loose matter. The fruit is then transferred to a drain board 3 over which it is caused to travel to a conveyer 4, the surplus moisture being drained off the fruit and carried to a point of discharge. The conveyer 4 carries the fruit over a cutting table 5 which is equipped with instruments which act upon the end portions of the fruit and remove the ends of the rinds. From the cutting table 5 the fruit is transferred to a conveyer 6 which carries it over a peeling table 7 at which are operatives equipped with knives especially adapted to loosen the rind and peel it from the fruit. The peeled fruit is then delivered by the conveyer 6 into a juice extractor or press 8 which fruit press or juice extractor may be of any approved detailed construction. The action of the juice extractor is to force all the juice from the fruit and deliver it into a pan 9 while the pulp and seeds will be drawn off through a suitable outlet and carried to a sewer or other place of disposal. The pan 9 is in communication with a tank 10 in which a vacuum is maintained so that the juices will collect therein and under the action of the vacuum will be caused to flow through a pipe 11 into the dehydrator, which is indicated generally at 12. The dehydrator will be presently more fully described but it may be noted upon reference to Figs. 1 and 2 that there is provided a heater 13 connected through a pipe 14 with channels at the bottom of the dehydrator so that hot water and steam will be delivered into said channels and caused to circulate tortuously through the bottom of the dehydrator, the cooler water being drawn off through a pipe 15 and carried to a tank 16 which is connected through a pipe 17 with a pump 18. The pump 18 has its discharge pipe 19 leading directly into the heater 13 so that the water will be again raised to the desired temperature and circulated through the dehydrator. The vapors rising from the fruit juice within the dehydrator are drawn off through a pipe 20 and delivered to a condensing tank 21. Said pipe 20 is connected with the inlet pipe 22 of a pump 23 so that the moisture in the heated vapors will be drawn off and transferred through a pipe 24 to the water tank 16 for circulation with the water through the heating compartment of the dehydrator. This water condensed from the vapors will, of course, be somewhat heated and will aid in raising the temperature of the heating circulating water. The pipe 20 leading into the condenser 21 is so disposed that as the vapors condense they will flow backward and drain into a condensation tank 25 in which they may be collected and subsequently disposed of in such manner as may seem most advantageous. The pump 23 will draw off the vapors and thereby maintain the vacuum in the dehydrator tank. Some of the vapor will pass into the condenser 21 and the water condensate will trickle to the tank 25 while the remainder of the vapor will be driven by the pump into the water tank 16. The concentrated juice is drawn from the dehydrator through a pipe 26 and delivered into a storage tank 27 from which it may be fed into containers under a vacuum so that it may be hermetically sealed and will remain in a sweet fresh condition indefinitely. If it is desired to reduce the juice to a powder, it may be removed from the storage tank 27 to a second dehydrator where it may have other pure materials added to it and subjected to the action of a vacuum for drawing off whatever moisture may have remained in it. Whether the juice be reduced to the form of a powder or maintained in a concentrated syrupy form, it will be pure fruit juice and when it is to be used all that needs to be done is to add to it pure fresh water, preferably distilled, so that it will be diluted to the desired degree and it will then have all the appearance, taste and color of the original pure juice.

The dehydrator is a tank built entirely of acid-proof metal and it may be noted at this point that all the parts of this apparatus, except possibly motion-transmitting belts, are constructed of acid-proof metal so that the juices will be kept pure and sanitary throughout the treatment and the creation of unsanitary conditions within the mechanism will be avoided. The tank or main body of the dehydrator may rest upon a base of any approved form and rails or bars 30 may be secured across the bottom to reinforce the same. The tank is also provided with a cover 31 which extends over the entire area of the tank and is reinforced by transverse channel bars 32, as shown clearly in Figs. 3 and 5. Corresponding channel bars 131 are also secured on the side walls to reinforce them. The cover is provided on its under side with a rib or cleat 33 which is beveled on its inner edge, as shown most clearly in Fig. 11, and is so located that it will engage within the tank and bear against the sides and ends of the same and thereby serve to properly center the cover upon the tank. A gasket 34 of any approved form is disposed between the projecting edge portions of the cover and the flanges 35 on the sides and ends of the tank so as to prevent leakage of vapors and the cover is held on the tank by clamps, shown most clearly in Fig. 11. Each of these clamps comprises a hook-shaped body 36, the shank of which is adapted to rest within the end of one of the channel bars 32 or within a box 37 of like form secured rigidly upon the upper side of the cover, the shank being thereby held against lateral movement, and the nib or bill of the hook passes across the edges of the cover and the flange 35 and engages under said flange. The shank of this hook-shaped clamp is equipped with a pin or stud 38 inserted therethrough and adapted to engage in longitudinal slots 39 formed in the sides of the channel bar 32 or the box 37 so that the clamp may be set so that the bill of the same will properly engage around the flange 35 and the edge of the cover notwithstanding some slight irregular formation of the same. A set bolt 40 is mounted in the shank of the clamp and is turned home against the bottom of the respective channel bar or box 37 and thereby causes the bill of the hook to firmly bind the cover onto the body of the tank.

The floor or bottom 41 of the tank is located a slight distance above the lower edges of its walls, as shown most clearly in Figs. 5 and 8, and to the walls of the body below the floor are secured angle bars 42 which are so arranged that their vertical webs will abut the floor or bottom while their horizontal webs will extend parallel with said floor or bottom and each said web will abut either the side wall of the tank or the vertical web of an adjacent angle bar. The feet or rails 30 are secured to the under sides of the horizontal webs of these angle bars, as shown clearly, and the several joints are brazed or welded so that there will be no leakage at any point. Upon reference to Fig. 8, it will be seen at once that these angle bars form parallel channels through which the hot water or steam fed thereto may circulate and, as shown in Fig. 7, the alternate angle bars have their opposite ends cut away, as indicated at 43, so that the hot water and steam may pass from one channel into an adjacent channel and thereby circulate back and forth over the entire area of the bottom of the tank. A longitudinal partition 44 is disposed centrally in the tank and on the bottom thereof and thereby divides the channels into two sets and causes the steam to circulate in two systems, each system heating one-half of the tank. The hot water supply pipe 14 communicates with the intake ports 45, each equipped with a cut-off valve 46 and each located at the center of the system of channels supplied by it. The hot water and steam will flow from the inlet to the opposite end of the tank where it will pass toward the opposite sides into adjacent channels and flow back to the front or entering end of the tank. It continues to flow back and forth until eventually the two streams reach the opposite sides of the system defined respectively by the partition 44 and the side wall of the tank and the streams then pass into the outlet ports 47 equipped with cut-off valves 48 and connected to the return pipe 15 to flow back to the water tank 16. By properly setting the valves 46 and 48, the rate of flow of the heating medium may be nicely regulated.

The juice is fed into the tank from the pipe 11 through a cut-off valve 49 and a nozzle 50 which is located on the side wall of the tank at the inner side of the same and is turned downwardly, as shown in Figs. 5 and 8, to deliver the juice onto the floor of the tank. The level of the juice within the tank will be determined by the location of the nozzle 50 as is evident and it is intended to supply the juice to the tank at the same rate that vapors therefrom are carried off so that in a short while the juice will have reached the consistency desired. At the receiving end of the tank, the partition 44 is provided with an opening 51 which extends the full height of the tank and permits a free circulation of vapors above the juice and return to the fan while at the delivery end of the tank there is only a small opening or slot 52 disposed below the surface line of the liquid in the tank and which prevents transfer of the vapors from one compartment to the other compartment while at the same time permitting passage of the juice. The outlet 53 for the concentrated juice is located at the bottom of the tank and is alined with the opening 52, the outlet being equipped with a cut-off or regulating valve 54, as will be understood.

At the discharge end of the tank is a fan chamber 55 which extends above the tank, as shown most clearly in Fig. 5, and the partition 44 has an extension 56 which is disposed centrally within said chamber, a circular opening 57 being provided in said extension and a rotary fan 58 being located within said opening, the shaft of the fan, indicated at 59, being coupled directly to the shaft of a motor 60, preferably an electric motor, so that the fan will be driven thereby. Mounted upon the fan chamber 55 is a second motor 61, the shaft of which carries a pulley 62 about which is trained a belt 63, said belt being also trained about a pulley 64 on the end of a countershaft 65 which extends through bearings provided therefor on the top of the fan chamber and has a worm 66 at its end remote from the pulley 64. The worm 66 meshes with a worm gear 67 carried by a short vertical shaft 68 mounted upon the top of the fan chamber and at the upper end of said shaft is a crank 69. The crank 69 is connected by a pitman 70 to a crank 71 on the upper end of a rock shaft 72 which is disposed vertically within the fan chamber and has a crosshead 73 secured to its lower end. Links 74 are pivoted to the ends of the crosshead 73 and extend therefrom into the upper portion of the tank, as shown clearly in Figs. 5 and 6. The ends of the links 74 are engaged upon pins 75 on cross rods 76 which are provided in the upper portions of the tank between the partition 44 and the respective side walls of the tank. To the ends of the rods 76 are attached bars 77 which extend longitudinally of the tank and are arranged adjacent the side walls of the same and adjacent the opposite sides of the partition 44, being supported by rollers 78 mounted upon the walls and the partition respectively, as will be understood. It will be readily understood that, when the motor 61 is running, the motion of its shaft will be transmitted through the described connections to the shaft 72 and the crosshead 73 so that said shaft and crosshead will be rocked and the links 74 will move simultaneously in opposite directions to transmit a reciprocating movement or travel to the rods 76 and the bars 77 attached thereto. The bars 77 are disposed one pair within each compartment of the tank defined by the partition and the side walls of the tank, and secured to and extending between the said bars are a plurality of rods 79, corresponding in all respect to the rods 76. Agitators 80 are suspended on and depend from each of the rods 76 and 79, and these agitators are blades which extend from the surface of the juice within the dehydrator tank 41, to near the floor 41, terminating just out of contact with the floor. Each blade is suspended from the respective rod by a pair of straps 81 having their upper ends formed into hooks 82 fitting over and partly encircling the respective rod, each hook being formed with a longitudinal slot 83 through which a pin 84 rises from the rod and, as shown in Figures 6 and 8, the slots in the hooks at one side of the partition face the fan chamber and at the opposite side of the partition the slots face in the opposite direction. When the rod is moving in one direction, the resistance offered by the body of juice tends to swing the blade backward but this action of the blade is resisted by the end of the slot 83 bearing against the pin 84, as will be understood upon reference to Fig. 10, so that, when moving in this direction, the agitator or blade will serve to feed the liquid forward and effect the desired circulation of the same. Upon the reverse travel of the rod, however, the blade will yield to the resistance of the liquid and, consequently, the liquid will not be violently stirred so as to alter the disposition of its constituent ingredients but will be caused to circulate constantly and only in one direction. Upon reference to Fig. 8, it will be noted that some of the blades are provided with notches 85 in one end edge. These notches serve as gages whereby the attendants may note the level of the juice at any time, peep holes, indicated at 86, being provided at various points in the cover and in the ends of the tank for that purpose.

A recording thermometer 87 is mounted upon the receiving end of the tank and has a tube 88 connected to its lower end and disposed within the juice-containing portion of the tank so that the temperature of the juice will be noted and recorded constantly.

It will be understood from the foregoing description, taken in connection with the accompanying drawings, that the valves 49 and 54 are so adjusted that the juice to be concentrated is fed into the tank at a rate equal to the rate of evaporation so that the level of the liquid in the tank will be approximately constant. The steam and hot water fed into the channels between the several bars 42 will heat the bottom of the tank and this heat, of course, will pass through the juice so as to vaporize the same, the vapors collecting in the upper portion of the tank. The fan 58 will act directly upon the vapors and will draw them from one compartment and into the other so that they will circulate around the partition within the tank and above the body of juice. As the vapors increase in weight and density, they are permitted to be drawn off through the several outlets connected to the pipe 20 and pass to the condenser 21, as previously stated. As the volatile matters are drawn from the juice, the juice will be more and more concentrated and when it has reached the desired consistency it will be drawn off through the outlet 53 and collected in the tank 27, as stated. The product is drawn off by reducing the vacuum in the dehydrating tank and raising the vacuum in the receiving tank and, as before stated, the product may be drawn from the receiving tank to a filling machine and put into containers and then sealed under vacuum, the filling being performed at a temperature of about forty degrees Fahrenheit. The juice is extracted from the fruit and the concentrated juice contains no foreign matter, the oils or terpenes present in the seed and rinds of the fruit being eliminated and there being no wood used in any part of the machine or apparatus to catch and retain particles of the fruit that would ferment. The juices, when drawn from the press, are pure and may be pasteurized or sterilized to be placed in containers and marketed as pure juice but when the process is continued by dehydration the juice is kept in constant motion under a vacuum with the temperature at all times remaining at about eighty degrees Fahrenheit. By operating under a low temperature, a product is produced that retains all its natural color, taste and food value. It may be reduced to the desired concentration and when restored to its natural consistency by dilution with pure water it produces a drink of the same quality as the original product. If desired to reduce to powder form, other pure ingredients may be added and the remaining moisture removed. The powder may be packed in air-tight containers and used for preparing beverages or for flavoring food products.

Having thus described the invention, I claim:

1. Means for dehydrating fruit juices comprising a tank, a longitudinal partition in the tank provided at the receiving end of the tank with an opening extending substantially the full height of the partition and provided at its opposite end at its lower edge with a relatively small opening, means for supplying juices to the tank at one end thereof, means for withdrawing concentrate at the opposite end of the tank, and oscillatory elements mounted in the tank at the sides of the partition and yieldable to the flow of juice in opposite directions at opposite sides of the partition to cause the juices to circulate continuously in one direction around the partition within the tank.

2. Means for dehydrating fruit juices comprising a tank, a longitudinal partition therein, said partition having an opening through its lower edge at one end and at the opposite end having an opening extending substantially the full height of the partition, means for supplying fruit juices to the tank at one end of the tank, means at the bottom of the tank for heating the same, and agitators mounted within the tank between the partition and the opposite sides of the tank, said agitators being arranged to yield to the fruit juices when moving in one direction but to effect circulation of the juices when moving in the opposite direction, and means for effecting reciprocatory travel of the agitators.

3. In means for dehydrating fruit juices, a tank, a longitudinal partition therein, means for supplying fruit juices to the tank, means for heating the bottom of the tank, bars mounted on the sides of the tank and on the sides of the partition to reciprocate longitudinally, cross rods connecting said bars at the opposite sides of the partition, means for reciprocating the bars at the opposite sides of the partition simultaneously in opposite directions, and agitators suspended on the cross rods and mounted to yield to the juices when moving in one direction but to effect movement of the juices when traveling in the opposite direction.

4. Means for dehydrating fruit juices comprising a tank, means for heating the bottom of the tank, a longitudinal partition in the tank, means for supplying fruit juices to the tank, a fan chamber at one end of the tank, an extension leading from the partition across said fan chamber, a fan mounted in said extension, means for driving the fan whereby to effect a constant circulation of the vapors above the fruit juices within the tank in one direction, agitators mounted within the tank between the partition and the opposite sides of the tank, and means for imparting reciprocatory travel to the agitators, the agitators being arranged to yield to the fruit juices when traveling in one direction and to effect circulation of the juices when traveling in the opposite direction.

5. Means for dehydrating fruit juices comprising a tank, a longitudinal partition therein, means for supplying juices to the tank, means for effecting flow of juices in opposite directions at opposite sides of the partition, means for withdrawing concentrate from the tank, means for circulating a heating medium under and in contact with the bottom of the tank, outlets for vapor in the upper portion of the tank, a fan chamber at one end of the tank transverse thereto and in communication therewith, and a fan in said chamber whereby to effect circulation of vapors above the juices around the partition in one direction to the vapor outlets.

6. Means for dehydrating fruit juices comprising a tank, means for supplying juices to the tank, means for withdrawing concentrate from the tank, means for heating the tank, a reciprocatory frame including cross rods mounted in the tank, blades hung on the rods and depending into the juices in the tank, the upper end portions of the blades slidably engaged over the rods and provided with slots extending transversely of the rods, and projections on the rods engaged in said slots and normally at one end of the respective slots whereby the blades may yield to the juices when moving in one direction but will effect circulation of the juices when moving in the opposite direction.

WALTER L. CLEMENT.